Sept. 6, 1932.  E. SCHWEIZER  1,875,665
SUPPORT FOR OPTICAL MICROMETERS
Filed June 25, 1928  3 Sheets-Sheet 1
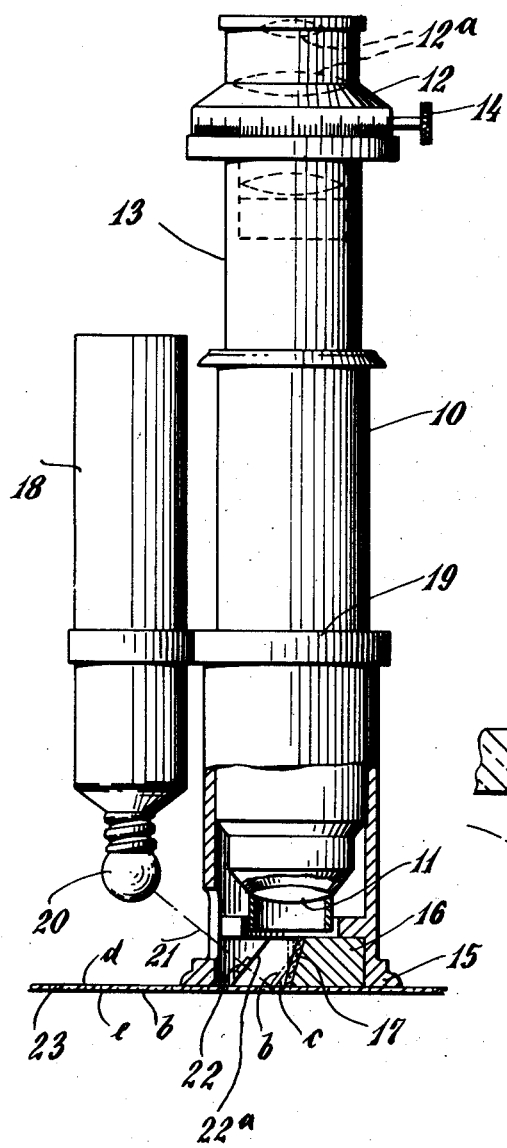
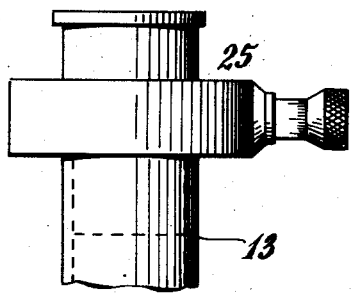
INVENTOR
Ernest Schweizer
BY
Edwards, Sager & Bower
his ATTORNEYS Sept. 6, 1932.  E. SCHWEIZER  1,875,665
SUPPORT FOR OPTICAL MICROMETERS
Filed June 25, 1928  3 Sheets-Sheet 2
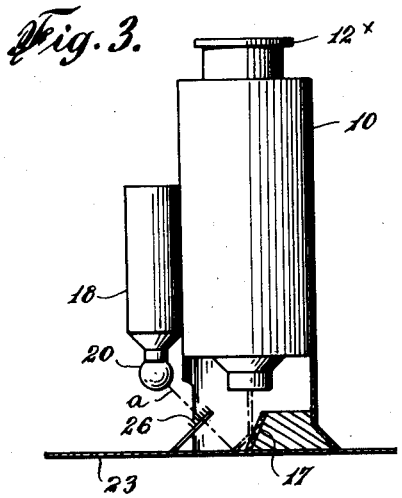
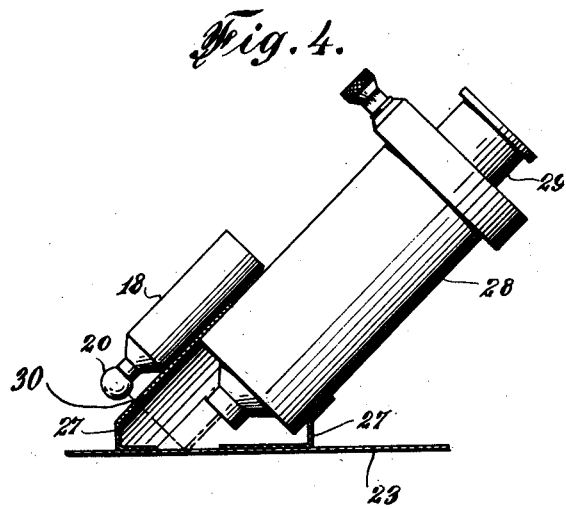
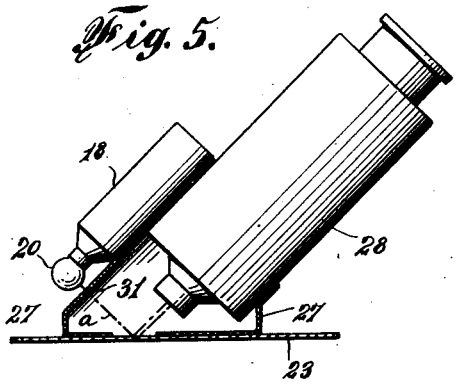
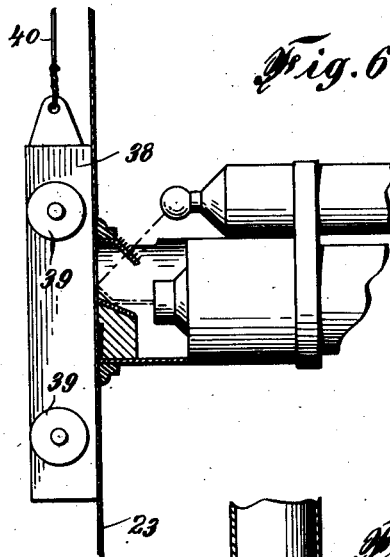
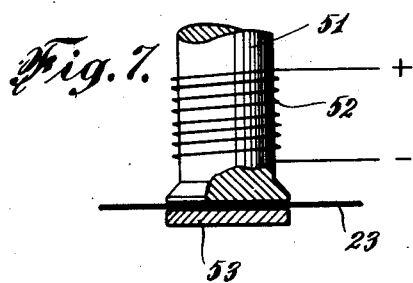
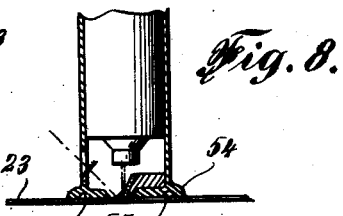
INVENTOR
Ernest Schweizer
BY
Edwards, Sager & Bower
his ATTORNEYS

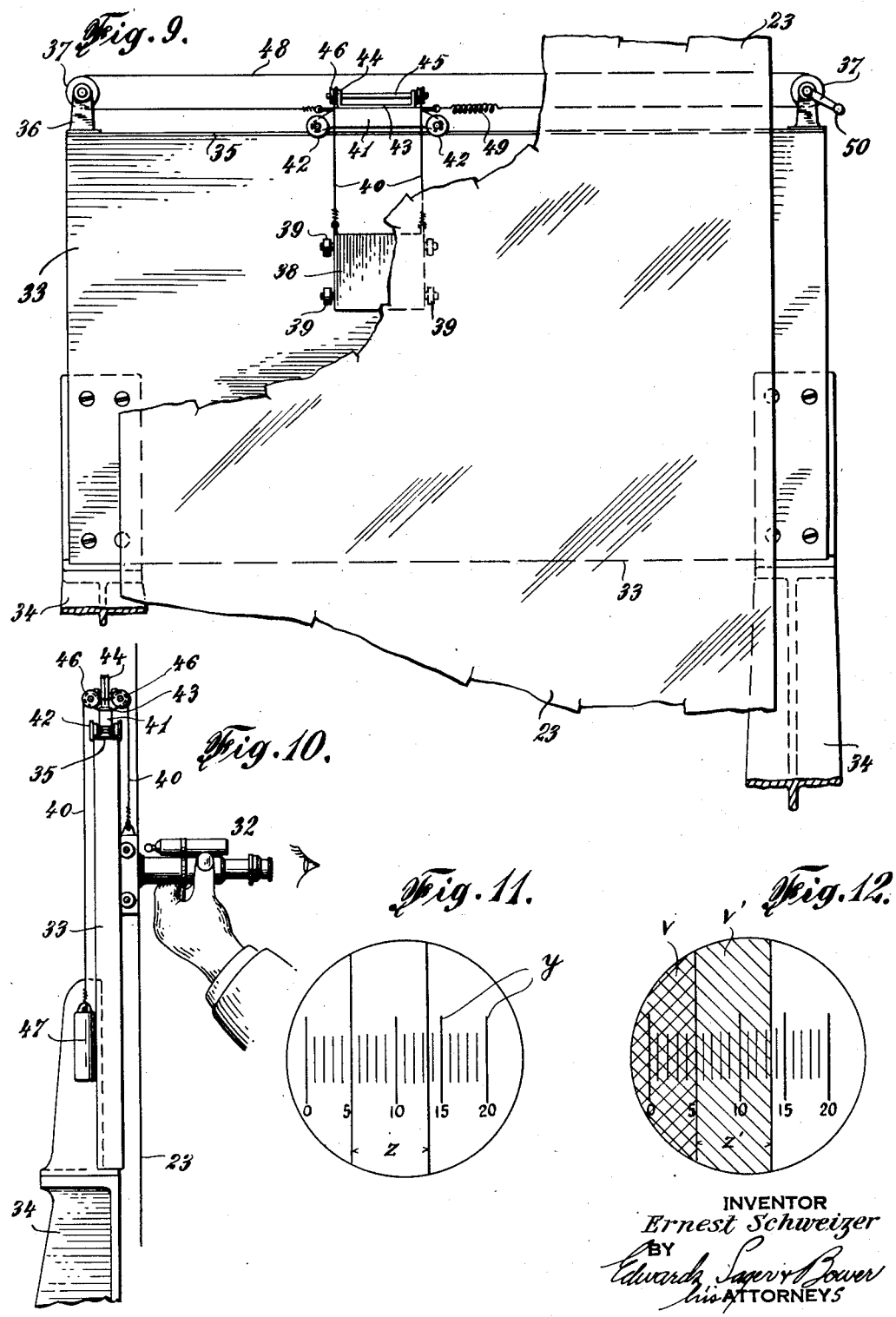

Patented Sept. 6, 1932

1,875,665

UNITED STATES PATENT OFFICE

ERNEST SCHWEIZER, OF EAST ORANGE, NEW JERSEY, ASSIGNOR TO CELLULOID CORPORATION, A CORPORATION OF NEW JERSEY

SUPPORT FOR OPTICAL MICROMETERS

Application filed June 25, 1928. Serial No. 287,948.

My invention relates to measuring instruments, and particularly to an instrument for measuring the thickness of sheet material which is transparent or substantially so.

The object of the invention, generally stated, is to provide a new and improved instrument of the character specified and one which makes use of certain principles of optics to enable minute variations in the thickness of such sheet material to be detected.

To the above and other ends which will subsequently appear, my invention consists in the features of construction, combinations of devices and arrangements of parts hereinafter described and particularly pointed out in the claims.

During the course of the manufacture of transparent sheets or films, and especially those of a flexible character, it is highly important to obtain accurate measurements or gaugings of the thickness of the sheet and frequently it is necessary to make such measurements or gaugings at different stages in the manufacture or process.

Means have heretofore been provided for measuring the thickness of sheet material; but such means have been subject to defects which make them undesirable in practice. Screw micrometers, for example, permit of measurements at only short distances from the edge portions of the material, and although such micrometers may be made with especially deep throats they have not been found practicable when the sheet has a comparatively broad area as is the case with photographic base or film before it has been cut into strips. Furthermore, it is difficult to obtain accurate readings with screw micrometers when applied to unseasoned, yielding sheets or sheeting.

The reason for this is that unless the pressure of application is carefully maintained below a certain limit the micrometer anvils will press into the material, thereby marring it and also resulting in erroneous readings.

It may also be said that glass-thickness gauges relying on optical principles, as heretofore made have proved unsatisfactory in practice, owing to the fact that they are liable to inherent parallactical errors. Moreover they have not been found to be serviceable in the detection of minute differences in thickness. For example, in the work for which the present invention was particularly designed, that is, the measurement of the thickness of photographic base or sheeting, the readings of the measuring instrument must disclose, in order to be serviceable, variations of 1/4000th of an inch at least, and no measuring means prior to the present invention has been found capable of such close gauging.

The present invention has resulted in the provision of a simple device capable of accurately measuring the thickness of transparent sheeting at any point in its extension and at any stage in the manufacturing process, without injury to the material or interruption of the process.

Each embodiment of the invention as herein disclosed is what may be termed an optical micrometer, and which depends for its results on certain principles of optics which may be briefly stated. When a beam or ray of light falls on a transparent sheet or plate, two primary reflections of said beam will occur, these reflections taking place at the bounding surfaces or faces of the material and which may, for purposes of description, be referred to as the near and far faces thereof.

If the incident beam is oblique to the surfaces the reflected beams will not coincide, but on the contrary will travel in parallel paths the distance between which is dependent substantially upon three conditions, namely, the angle of incidence of the beam, the thickness of the sheet and the index of refraction of the material of which it is composed. In other words, for a given thickness of sheeting the distance between the two reflected beams is dependent upon the angle of incidence and the index of refraction. Assuming that the material is substantially homogeneous the index of refraction in the case of photographic base or film will be constant and approximately 1.5. It has been found that the spread or distance between the paths of the two reflected rays bears a specific relationship to the index of refraction, enabling that angle of incidence to be determined which will result in the greatest spread or distance. For most transparent solids or liquids the angle of incidence as so determined and which will result in the condition of maximum spread or optimum lies between 45° and 53°.

Accordingly in carrying out the invention there has been provided a tube containing a suitable optical system and mounted on a support for fixing its position with respect to the surface of the sheet or film, in combination with a source of light, so related that the incident beam therefrom will strike the sheeting at the optimum aforesaid, a hair line, scale or indicia being so arranged with reference to the tube and the beam that reflected beams or images will be reflected from both the near and far surfaces of the sheet or film for comparison.

This construction enables the thickness of the film or sheet to be measured by observing through the tube the relative displacement of the images or separation of the beams. The operation is quickly and conveniently performed so that results may be readily obtained at different points widthwise and lengthwise of the sheet or film and it is only necessary for the observer to take down or read off to a checker the readings to enable substantially the thickness of the sheet or film to be gauged.

The invention will be described in detail in connection with the accompanying drawings, wherein Fig. 1 is an elevation of an instrument embodying the invention, parts being shown in section.

Fig. 1a is a diagrammatic view on an enlarged scale showing the courses followed by the beams or rays of light in the Fig. 1 construction.

Fig. 2 is a fragmentary elevation of a modification embodying a filar micrometer.

Fig. 3 is an elevation of a modification embodying a scale and dispensing with a micrometer eyepiece.

Figs. 4 and 5 are elevations partly in section of further modifications in which the tube of the instrument is so inclined as to enable the reflecting mirror of the prior constructions to be dispensed with.

Fig. 6 is a diagrammatic view showing the invention embodying an instrument for conveniently measuring a continuously moving sheet.

Fig. 7 is a diagrammatic view showing electrical means for insuring proper contact between the measuring instrument and the sheet;

Fig. 8 is a diagrammatic view showing suction means for maintaining such contact;

Figs. 9 and 10 are front and side elevations respectively of the instrument or device shown in Fig. 6 for facilitating measurements of moving sheets.

Fig. 11 is a diagrammatic view of the microscopic field as seen when using a hair line index and a graticule in the eye-piece; and Fig. 12 is a corresponding view such as is presented when using a razor blade edge as an index or object.

Referring first to the form of the invention shown in Fig. 1, 10 indicates an upright main tube provided with any suitable optical system which need not be described in great detail since such systems are well known. It may comprise a single or multiple object-glass 11; and an eye-piece element 12 mounting a single or multiple lens 12a and a graticule or scale and fitted in a tube 13 adjustable relatively to the tube 10. An adjusting screw 14 for the graticule is provided. The base portion 15 is broadened and its outer face flattened for close application to the sheet. Within the base 15 is secured a support 16 for a reflecting mirror 17. By the use of the optical system, the rays are reflected through the object glass, forming a real image in the plane of the graticule, which real image is magnified from the eye-piece so that the imaginary image presented is on a larger scale.

The source of light may comprise a battery 18 secured by a band 19 to the instrument and provided with a bulb 20 whose light passes through an opening 21 in the base 15 and illuminates any suitable object or index, as a razor-blade or hair line 22 on an element 22a, so related to the bulb 20 and to the sheet 23 of the material to be measured as to fulfill the optimum condition referred to. The incident beam or ray $a$ striking the sheet 23 has two primary reflections $b$ and $c$ which occur at the upper and lower surfaces $d$ and $e$ respectively (Fig. 1a).

The reflection $b$ from the upper surface $d$ of the sheet is reflected directly into the air without entering the material of the sheet. The angle of reflection, that is the angle between the reflected ray $b$ and the normal $x$ to the sheet, being equal to the angle of incidence, that is, to the angle between the incident beam $a$ and the normal $x$. However, the reflected ray $c$ is spaced and disposed parallel to the reflected ray $b$, this spacing being due to the fact that part of the incident ray $a$ entering the sheet is refracted towards the normal as indicated at $a'$, this refracted ray striking the far surface $e$ of the sheet and thence being reflected upward as indicated at $c'$ until it strikes the upper surface $d$ of the material where it is refracted to the course indicated at $c$. The two parallel beams $b$ and $c$ are reflected by the mirror 17 into the instrument and along the optical axis thereof, the graticule on the eyepiece 12 affording convenient means for reading the spread whereby the thickness of the sheet 23 is gauged or measured. It will be understood, of course, that in the drawings the thickness of the sheet has been exaggerated for convenience of illustration; and further that the diagram in Fig. 1ª is merely illustrative and does not pretend to measure the angles of reflection and refraction with scientific accuracy.

It will be seen that the described embodiment of the invention enables the thickness of the sheet to be obtained merely by application of the measuring instrument to one face thereof so that no injury to the sheet will result and any point on the sheet may promptly be gauged, this being possible even when contact with one side only of the sheet is afforded as when the sheet is wound on a drum or curved surface.

The Fig. 1 construction as described is to be understood as being merely typical and variations or modifications will readily suggest themselves. For example, when the highest precision is desired a construction such as that shown in Fig. 2 may be employed wherein the tube 13 of the instrument may be provided with a filar micrometer designated as whole by the numeral 25.

With the modified construction in Fig. 3 no micrometer eyepiece is required since the hair line of the Fig. 1 construction is substituted by a scale or index 26. The other parts are substantially the same as in the Fig. 1 construction and are therefore correspondingly numbered except that the top member of the instrument being different and omitting the micrometer eyepiece is designated by the reference character 12ˣ.

In the Fig. 3 construction it will be understood that the images formed by the reflection of the index from both the near and far surfaces of the sheet are such that the thickness of the sheet may be measured by observing the displacement of said images in respect to each other.

In the embodiment of the invention illustrated in Fig. 4 a construction is provided which does away with the reflecting mirror of the prior constructions. In Fig. 4 the base element designated as a whole by the numeral 27 is so constructed as to permit the tube 28 to be inclined at such an angle that the reflections of the incident beam will be reflected directly through the instrument to the eyepiece at the top portion 29 thereof. The incident beam in this construction is shown as entering through a slit 30 in the base 27.

In the Fig. 5 construction the instrument is inclined as in the Fig. 4 construction but is provided with a scale or gauge 31 on the base in place of the slit 30 of the Fig. 4 construction.

As has been stated, the invention is particularly adapted for use with a moving sheet or base whose thickness is to be measured; and to facilitate such use the instrument may be employed in combination with a movable backing, the sheet being interposed between the instrument and the backing so that when pressure is applied to the sheet through the instrument the backing will ride down or move concurrently with the sheet so as not to interfere in any way with the process or manufacture. A movable backing of this sort is illustrated in Figs. 6, 9 and 10 wherein the instrument is designated as a whole by the numeral 32, it being understood that such instrument may be of one of the forms disclosed herein or of any other construction embodying the principles of the invention. The backing device may be in the form of a counterweighted carriage supported on a vertically disposed frame or board 33 having standards or legs 34. The top of the board supports a metal strip or track-way 35 and at its ends has short standards or brackets 36 carrying pulley wheels 37. The movable backing proper is in the form of a small rectangular plate 38 which may be of metal such as brass having a black paper facing. The plate 38 is vertically disposed at the front of the board 33 and is provided with a set of small wheels or rollers 39 which are adapted to travel over the face of said board with a minimum of friction.

The plate is in effect a movable carriage and is in turn carried by a supplemental carriage, said plate being suspended by flexible elements or cords 40 from said supplemental carriage which comprises a truck 41 provided with two pairs of flanged wheels 42 which ride on the track-way 35.

On its top the truck 41 supports an angular bracket 43 having upstanding ears 44 which provide supports for shafts 45 carrying pulley wheels 46. These pulley wheels are disposed in pairs fore and aft or transversely of the plate 38 and the supporting cords 40 run over the pulley wheels and extend downward behind the board 33 where they are attached to a counterweight 47. To enable the contrivance comprising the connected carriages 38 and 41 to move widthwise of the board 33, the truck 41 has connected to its opposite ends a flexible element or cord 48 which runs over the pulleys 37 and has an interposed spring 49 which gives sufficient tension to move the cord and cause the carriages to move widthwise whenever one of the pulleys 37 is turned. This may be effected, for example, by a handle 50 associated with one of the pulleys 37. It will be understood that when the handle is turned the contrivance as a whole comprising the carriages 38 and 41 will move transversely of the board, the rollers 42 running on the track 35.

The sheet or film which, as shown in Fig. 9, may be of a width somewhat less than the board 33, moves slowly downward over the board and over the front face of the plate-like carriage 38, which, it will be apparent, may be moved to any desired point width-wise of the moving sheet through transverse movements of the carriage 41. In making use of the backing contrivance, the operator applies the instrument or optical micrometer to it through the interposed sheet or film 23, and the resultant pressure against the sheet and the front face of the plate 38 affords sufficient friction to prevent relative movements among the three elements, thus avoiding all scratching or marring of the face of the film.

As the film or sheet 23 moves downward it will be clear that the carriage 38 will be caused to automatically move downward with it along with the instrument as applied by the operator so that the reading is not affected.

Besides such variations in the construction of the measuring instrument proper as have been described, variations may be made in the manner or method of applying the instrument to the sheet to be gauged. For example, in Fig. 7 the lower portion or base 51 of the instrument is constructed of iron or steel associated with a solenoid 52 whereby the base is magnetized at will and caused to attract an armature 53. The instrument and the armature are disposed at opposite sides of the sheet 23, the arrangement being such that when the lower portion or base 51 is magnetized it will attract the armature and as a result a suitable contact will be maintained with the sheet 23.

In Fig. 8 the lower or base portion 54 is illustrated as formed along its under face with suitable openings or ports 55. The construction is such that when the instrument is placed against the surface of the film or sheet and a suction is applied to the base by any suitable means, the sheet will be held in desired contact with the instrument.

Referring generally to the invention it will be seen that the optical axis being normal to the plane of the images, parallactical error is eliminated and the magnification is not restricted by considerations of focal depth. This will be appreciated from further consideration of Fig. 1ª. In said figure assuming the refraction index of the medium or sheet 23 to be approximately 1.50 the angle of incidence of the ray $a$ giving a maximum spread between the two reflected rays $b$ and $c$ is substantially 49° 12'.

Assuming that S represents a suitably illuminated index or object, the ray $b$ reflected from the near surface $d$ comes seemingly from the image S' of the index S; while the ray $c$ reflected from the far surface $e$ comes seemingly from the image S" which is situated at a point on the caustic $k$. The spread between the two rays $b$ and $c$ is the greatest obtainable for this material and the given thickness. The images S' and S", it will be observed, are situated in a plane $p$ which is disposed vertically to the rays $b$ and $c$, these representing the direction of vision, the result being that parallactic errors are eliminated.

At this point, attention may be called to Figs. 11 and 12 which are diagrammatic views illustrating microscopic fields. If a hair line index, for example, be used, and the instrument be provided with a graticule or scale, such as $y$ in the eye-piece, the field, as observed by the operator, will correspond to Fig. 11 wherein the spread between the two images is indicated at $z$. On the other hand, if a razor blade be employed instead of a hair line, the edge of the razor blade illuminated from the source of light will be represented in the microscopic field viewed by the operator as in Fig. 12 resulting in overlapping shadows $v$ and $v'$, the spread in this case being designated at $z'$. It will be understood that although the description has been simplified, what has been said applied generally whether to overlapping images or to lines which may be regarded individually or as the boundaries of zones, etc.

Certain of the advantages of the invention may be briefly summarized. By its use a result is accomplished which heretofore has been infeasible, namely, measurements may be made of the thickness of a medium or sheet which is extremely thin. For example, measurements are practical of sheets from .003 of an inch to .012 of an inch in thickness as is constantly being demonstrated in practice.

In addition to the attainment of a high degree of precision as just explained, parallactic error is avoided when the parts are set for the most advantageous angle or what has been referred to as the optimum. The percentage of precision is independent of the thickness of the sheet or plate. The instrument embodying the invention is applicable where only one side of the sheet is accessible as on the wheel of a film-forming mechanism at the point of stripping or even where the depth of dope-spread, so-called, at any particular place is to be ascertained. There is independence of the extent of surface under measurement. The use of the invention obviates injury where the material is tender or yielding. And finally it will be seen that the construction is comparatively simple and inexpensive and may be adjusted and manipulated with speed and facility.

I claim:

1. In means for measuring the thickness of a moving sheet of transparent film, the combination of a movably mounted transparent film, a movably mounted backing element on one side of said moving sheet and mounted so that it may move in the direction of travel of said moving sheet, and a device for optically measuring the thickness of said sheet having a member adapted to be pressed against the other side of said moving sheet, whereby when the measuring device is pressed against the moving sheet the backing element moves with said sheet.

2. In means for measuring the thickness of a moving sheet, the combination of a movably mounted transparent sheet whose thickness is to be measured, a backing on one side of said moving sheet, a carriage riding transversely of the sheet, a pulley supported by said carriage, a flexible cord passing over said carriage having a counter weight attached to one end thereof, the other end of the cord being secured to the backing, and a device for optically measuring the thickness of said sheet having a member adapted to be pressed against the other side of said moving sheet, whereby when the measuring device is pressed against the moving sheet the backing element moves with said sheet.

ERNEST SCHWEIZER.